(12) United States Patent
Fery et al.

(10) Patent No.: US 8,072,872 B2
(45) Date of Patent: Dec. 6, 2011

(54) OPTICAL STORAGE MEDIUM COMPRISING INVERTED SUPER-RESOLUTION PITS AND LANDS

(75) Inventors: Christophe Fery, Niedereschach (DE); Larisa von Riewel, Viillingen-Schwennigen (DE); Gael Pilard, Moenchweiler (DE); Herbert Hoelzemann, Villingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 12/736,072

(22) PCT Filed: Mar. 6, 2009

(86) PCT No.: PCT/EP2009/052659
§ 371 (c)(1),
(2), (4) Date: Oct. 2, 2010

(87) PCT Pub. No.: WO2009/109653
PCT Pub. Date: Sep. 11, 2009

(65) Prior Publication Data
US 2011/0038248 A1 Feb. 17, 2011

(30) Foreign Application Priority Data
Mar. 7, 2008 (EP) .................................... 08102389

(51) Int. Cl.
*G11B 7/24* (2006.01)
(52) U.S. Cl. .................. 369/275.4; 369/13.54
(58) Field of Classification Search ............... 369/275.4, 369/275.1, 275.3, 13.54, 13.55, 59.23, 59.25
See application file for complete search history.

(56) References Cited

U.S. PATENT DOCUMENTS

| | | | |
|---|---|---|---|
| 2003/0107977 A1 | 6/2003 | Nakano et al. | |
| 2004/0190432 A1* | 9/2004 | Ichihara et al. | 369/275.1 |
| 2005/0079313 A1* | 4/2005 | Kim et al. | 428/64.4 |
| 2005/0117478 A1* | 6/2005 | Kuwahara et al. | 369/59.11 |
| 2005/0157631 A1 | 7/2005 | Lee et al. | |
| 2005/0170133 A1* | 8/2005 | Ahn et al. | 428/64.4 |
| 2005/0237912 A1* | 10/2005 | Kikukawa et al. | 369/275.4 |
| 2006/0040088 A1* | 2/2006 | Hirotsune et al. | 428/64.4 |
| 2006/0250916 A1* | 11/2006 | Kikukawa et al. | 369/59.11 |
| 2007/0009702 A1* | 1/2007 | Hirotsune et al. | 428/64.4 |
| 2007/0081443 A1* | 4/2007 | Kikukawa et al. | 369/126 |
| 2007/0140087 A1* | 6/2007 | Fukuzawa et al. | 369/59.11 |
| 2009/0016205 A1* | 1/2009 | Kikukawa et al. | 369/275.3 |

FOREIGN PATENT DOCUMENTS
EP 1074984 2/2001

OTHER PUBLICATIONS

Kikukawa et al., "High-Density Read-Only memory Disc with Super Resolution Reflective Layer", Japanese Journal of Applied Physics, vol. 40, Part 1, No. 3B, Mar. 2001, pp. 1624-1628.
Search Report Dated Apr. 24, 2009.

* cited by examiner

*Primary Examiner* — Thang Tran
(74) *Attorney, Agent, or Firm* — Myers Wolin, LLC

(57) ABSTRACT

The optical storage medium comprises a substrate layer, a data layer having a pit/land data structure with data arranged in tracks on the substrate layer, and a nonlinear layer with a super-resolution structure disposed on the data layer, wherein a land having a size below the diffraction limit is inverted to a pit and enclosed by auxiliary lands, and a pit having a size below the diffraction limit is inverted to a land and enclosed by auxiliary pits. The optical storage medium is in particular a read-only optical disc comprising a phase-change material, for example AgInSbTe, for providing the super-resolution effect.

14 Claims, 3 Drawing Sheets

OPTICAL STORAGE MEDIUM COMPRISING INVERTED SUPER-RESOLUTION PITS AND LANDS

This application claims the benefit, under 35 U.S.C. §365 of International Application PCT/EP2009/052659, filed Mar. 6, 2009, which was published in accordance with PCT Article 21(2) on Sep. 11, 2009 in English and which claims the benefit of European patent application No. 08102389.7, filed Mar. 7, 2008.

TECHNICAL FIELD OF THE INVENTION

The present invention relates to an optical storage medium comprising a substrate layer, a data layer and a nonlinear layer with a super-resolution structure arranged above the data layer. The data layer comprises in particular pits and lands having a size above a diffraction limit and pits and lands having a size below said diffraction limit of a pickup for reading of the data as arranged on the data layer.

BACKGROUND OF THE INVENTION

Optical storage media are media in which data are stored in an optically readable manner, for example by means of a laser and an optical detector, for example a photodetector, being integrated within a pickup. The detector is used for detecting reflected light of the laser beam when reading data on the storage medium. In the meanwhile a large variety of optical storage media are known, which are operated with different laser wavelength, and which have different sizes for providing storage capacities from below one Gigabyte up to 50 Gigabyte (GB). The formats include read-only formats such as Audio CD and Video DVD, write-once optical media such as CD-R and DVD-R, DVD+R, as well as rewritable formats like CD-RW, DVD-RW and DVD+RW. Digital data are stored on these media along tracks in one or more layers of the media.

The storage medium with the highest data capacity is at present the Blu-Ray disc (BD), which allows to store up to about 50 GB on a dual layer disc. For reading and writing of a Blu-Ray disc an optical pickup with a laser wavelength of 405 nm and a numerical aperture of 0.85 is used. On the Blu-Ray disc a track pitch of 320 nm and a mark length from 2 T to 8 T or 9 T is used, where T is the channel bit length and wherein 2 T corresponds with a minimum mark length of 138-160 nm.

The spatial resolution limit of optical instruments as described by the Abbe theory is about lambda/2NA, which is lambda/2NA=238 nm for a Blu-Ray type pickup having a laser wavelength lambda=405 nm and a numerical aperture NA=0.85. For the diffraction limit of a pickup for the read out of the high frequency (HF) data signal of a Blu-Ray disc, a higher resolution can be obtained because of the differential signal detection, when the laser beam moves over the pits and lands of a track on the Blu-Ray disc. By providing a reference level for the HF read out signal, very small amplitude changes can be detected, in accordance with the different reflectivity of the pits and lands, which allows to detect pits with a Blu-Ray type pickup having a size of about lambda/4NA=120 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Further, semiconductor materials can be used as a nonlinear layer, e.g. InSb, which show a higher reflectivity in the center part of the focused laser beam, and which center reflectivity is dependent on the pit structure of the corresponding data layer. Therefore, the super-resolution effect allows to record and read data stored in marks of an optical disc, which have a size below the diffraction limit of lambda/4NA of a corresponding optical pickup.

The nonlinear layer is often called a super-resolution near-field structure (Super-RENS) layer because it is assumed that for some specific materials, the optical effect of reducing the effective spot size of the laser beam is based on a near-field interaction between the marks and spaces of the data layer and the nonlinear layer. Super-RENS optical discs comprising a super resolution near-field structure formed of a metal oxide, a polymer compound or a phase change layer comprising a GeSbTe or a AgInSbTe are known.

BRIEF SUMMARY OF THE INVENTION

The optical storage medium comprises a substrate layer, a data layer having a pit/land data structure with data arranged in tracks on the substrate layer, and a nonlinear layer with a super-resolution structure disposed on the data layer, wherein the data structure comprises pits and lands having a size above a diffraction limit of a pickup for reading of the data and pits and lands having a size below the diffraction limit. A land having a size below the diffraction limit is inverted to a pit and a pit having a size below the diffraction limit is inverted to a land, wherein a land being inverted to a pit and a pit being inverted to a land are enclosed by auxiliary lands and/or pits. The super-resolution structure comprises in particular a phase change material, for example a chalcogenide material, providing an "aperture" type super-resolution mechanism, when irradiated with a high intensity laser beam of the pickup. With the inverted pits and lands having a size below the diffraction limit, an inverted data structure is provided for the smallest pits and lands on the optical storage medium, to solve the problem of the inverted signal of the smallest pits and lands of the read out signal when reading the data on the optical storage medium. This allows a correct decoding of the data as arranged on the tracks of the data layer of the optical storage medium.

In a preferred embodiment, an inverted land is separated from the preceding pit by an auxiliary land and separated from the subsequent pit by an auxiliary land, and an inverted pit is separated from the preceding land by an auxiliary pit and separated from the subsequent land by an auxiliary pit, wherein the auxiliary lands and pits have a size being below the diffraction limit. The auxiliary lands have for example a size corresponding with a 1 T land and the auxiliary pits have a size corresponding with a 1 T pit, and a diffractive land preceding or a diffractive land following an inverted pit is shortened by a length corresponding with the length of the auxiliary pit, and a diffractive pit preceding or a diffractive pit following an inverted land is shortened by a length corresponding with the length of the auxiliary land. The pits and lands of a track having a size below the diffraction limit are in particular 2 T and/or 3 T pits and lands, wherein the diffraction limit is defined as lambda/4NA.

The optical storage medium is in a further aspect of the invention a ROM disc, comprising pits and lands as marks and spaces, the pits being molded or embossed on the surface of the substrate by using a respective stamper.

BRIEF DESCRIPTION OF THE DRAWINGS

Preferred embodiments of the invention are explained now in more detail below by way of example with reference to schematic drawings, which show.

DETAILED DESCRIPTION OF PREFERRED EMBODIMENTS

Figure 1:
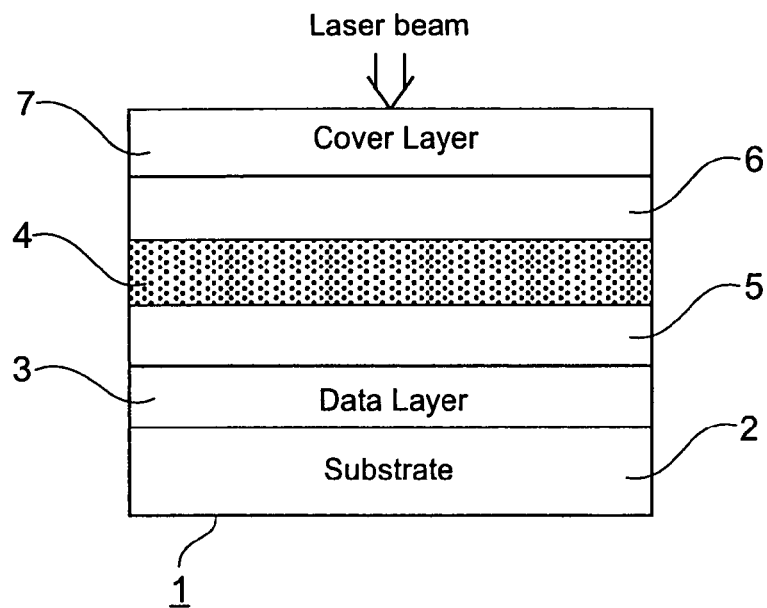
FIG. 1 an optical storage medium in a sectional view with a layer stack comprising a substrate, a data layer and a non-linear layer, FIG. 2 spectral distributions of HF data signals of super-resolution discs comprising a non-linear AgInSbTe layer and a non-linear InSb layer, FIG. 3 signal amplitudes of an AgInSbTe and a InSb super-resolution disc comprising a sequence of 20 2 T pits, separated each by a 2 T land, FIG. 4 a calculated HF signal for a random sequence of pits and lands of a super-resolution disc comprising an InSb non-linear layer, FIG. 5 a calculated HF signal for a random sequence of pits and lands of a super-resolution disc comprising an AgInSbTe non-linear layer, and FIG. 6 a data layer comprising inverted super-resolution pits and lands of an optical storage medium in accordance with FIG. 1, and a respective calculated read-out signal.

In FIG. 1 an optical storage medium 1 is shown in a cross section in a simplified manner. The optical storage medium 1 is for example a read-only (ROM) optical storage disc. On a substrate 2 a data layer 3 is arranged which may comprise a reflective metallic layer, for example an aluminum layer. The data layer 3 has a data structure consisting of marks and spaces arranged on essentially parallel tracks. In the case of a ROM disc, the marks and spaces consist of pits and lands, the pits being molded or embossed on the surface of substrate 2 representing the data layer 3. On the data layer 3 a first dielectric layer 5 is arranged and on the dielectric layer 5 a nonlinear layer 4 is arranged for providing the function of a mask layer for utilizing a super-resolution effect. The nonlinear layer 4 is for example a mask layer comprising a super-resolution structure, e.g. a super-resolution near-field structure (Super-RENS). The optical storage medium 1 is in particular an optical disc having a size similar to DVDs and CDs.

Above the nonlinear layer 4 a second dielectric layer 6 is disposed. As a further layer, a cover layer 7 is disposed on the second dielectric layer 5 as a protective layer. For reading the data of the data layer 3, a laser beam is applied in this embodiment from the top of the storage medium 1, penetrating first the cover layer 7. The first and second dielectric layers 5, 6 comprise for example the material $ZnS-SiO_2$. The substrate 2 and the cover layer 7 may consist of a plastic material, as known from DVDs and CDs. In other embodiments, the reflective metallic layer may be omitted, when a super-resolution near field structure is used, which does not provide an increase in transmittance due to a heating effect, but works with another nonlinear effect, for example utilizes an effect providing an increased reflectivity of the nonlinear layer 4 when irradiated with a laser beam. The layers of the storage medium 1 are arranged in particular as a layer stack.

The super-resolution effect allows to detect pits, which have a size, in particular a length, which is below the diffraction limit of a corresponding apparatus for reading of the data of the optical storage medium. It has been demonstrated that the super-resolution detection of an optical disc comprising a phase change material or a semiconductor material is related to a local change of the optical properties of the non-linear layer 4. For phase change materials, for example AgInSbTe, it is assumed that the temperature increase due to the focus laser spot is responsible for the super-resolution effect, which provides an aperture only in a small center of the laser spot. This is a priori due to a low thermal conductivity and a strong optical non-linearity of the material.

This effect is also assumed for other chalcogenide materials, which comprise a chalcogenide element like sulphur, selenium, tellurium and one or several more electropositive elements like arsenic, germanium, phosphor or antimony. The chalcogenide materials are glasslike materials which show two stable phases, an amorphous and a crystalline phase. By heating a chalcogenide material with a high intensity laser beam, a phase transition from the crystalline to the amorphous phase is provided. For a super-resolution optical disc, the intensity of the laser beam of a corresponding optical pickup is adjusted such, that only for a small centre part of the laser spot on the storage medium a phase transition is provided for providing an "aperture type" super-resolution effect.

Also optical super-resolution discs comprising a semiconductor material as a super-resolution structure have been investigated, and in particular for III-V semiconductors having a low activation threshold, for example InSb, good results could be obtained. For the semiconductor materials, it is assumed that the high light intensity of a laser beam shifts electrons from the valence band to the conduction band, which increases the reflectivity of the semiconductor material. The change in reflectivity is dependent whether a pit or a land is arranged in the near-field below on the data layer.

With ROM discs comprising an alternating pattern of 80 nm pits and lands on the data layer, a carrier to noise ratio of about 40 db could be obtained for InSb as well as for AgInSbTe as the super-resolution structure, when a sufficiently high laser power was provided for triggering the super-resolution effect. Tests were made also with random pit/land patterns and a bit error rate of about $1.10^{-3}$ was obtained for the semi-conductor based InSb disc. But it was impossible to decode the data pattern on the phase change based AgInSbTe disc.

Figure 2:
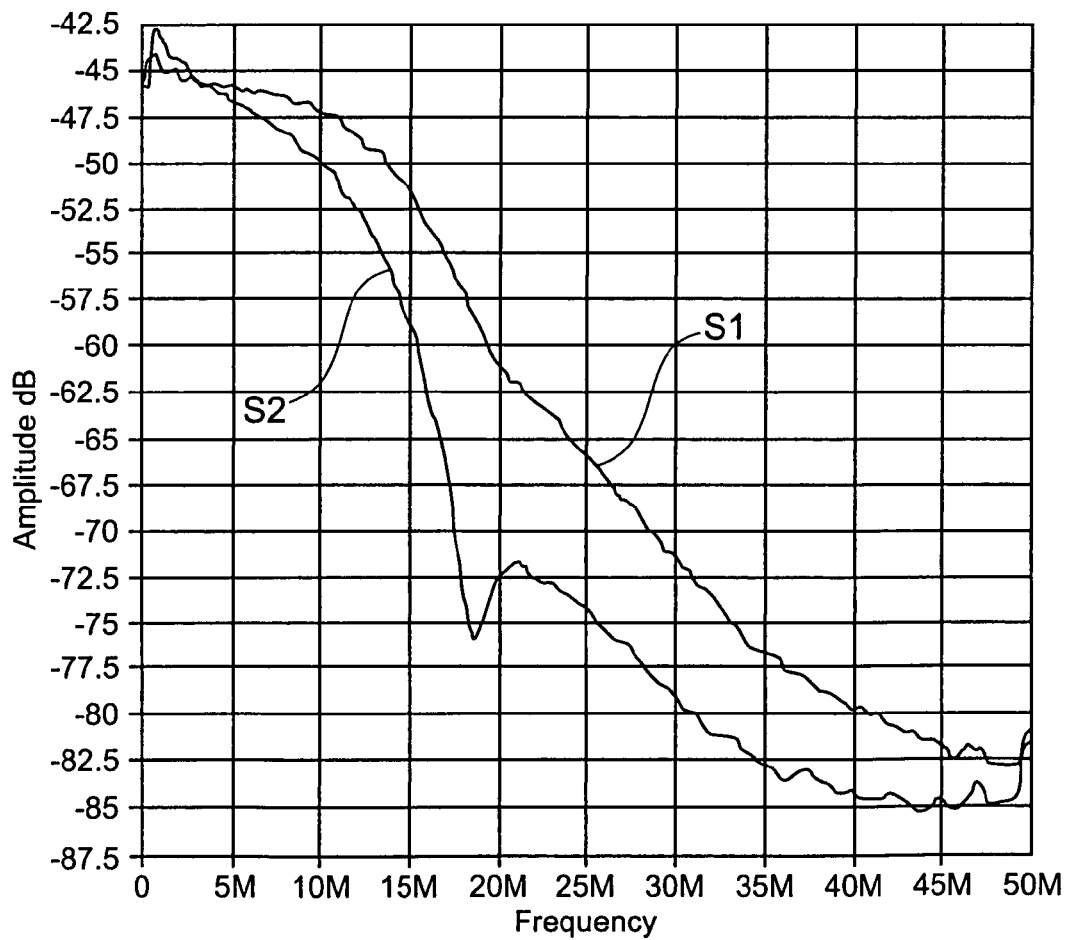

When investigating the spectral distribution of high frequency (HF) data signals corresponding to random data patterns of super-resolution discs, a surprising effect was revealed for the discs with the AgInSbTe material, as shown in FIG. 2. Signal S1 is a spectral distribution of the HF signal of an InSb super-resolution disc, which shows a smooth decay for frequencies above 10 MHz. But for the disc with the AgInSbTe phase change material, a dip occurs at about 18 MHz, signal S2, which frequency corresponds essentially with the diffraction limit of the optical pickup. Also, at the frequency of 30.7 MHz, which corresponds with the HF signal of 2 T pits having a length of 80 nm, the amplitude of signal S2 is about 7.5 db below the amplitude of signal S1. It seems therefore that for the AgInSbTe disc, an interference occurs between the detection of pits and lands having a size above the diffraction limit and of pits and lands having a size below the diffraction limit of the pickup, which reduces the detectability of the pits having a size below the diffraction limit.

For obtaining the signals S1 and S2, super-resolution discs were used with a random data pattern with pits and lands based on a channel bit length of 40 nm. Also, the bit error rate was measured for the discs. For the semiconductor based disc a bit error rate as low as 1.10-3 was obtained while no decoding was possible for the disc with the AgInSbTe phase change material. Otherwise, the disc with the AgInSbTe material showed a high carrier-to-noise ratio.

Figure 3:
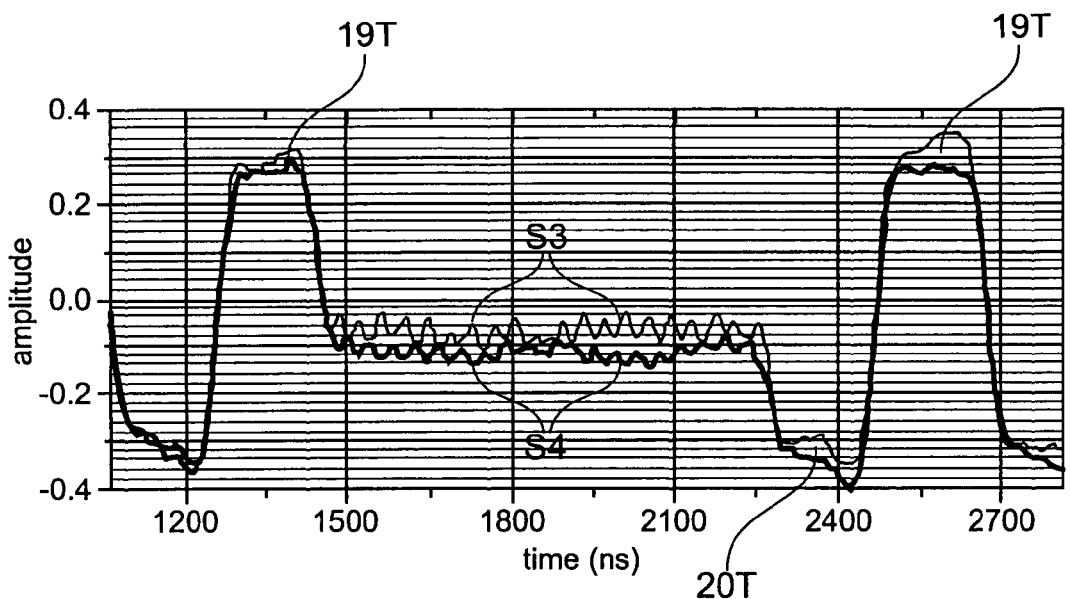

To study this effect in more detail, super-resolution discs comprising a sequence of 20 pits with length of 2 T=100 nm, separated each by a 2 T land, which are arranged between a 19 T land and a 20 T pit followed by a 19 T land were manufactured for both materials InSb and AgInSbTe. The results are shown in FIG. 3. As expected, for the pits and lands having a size above the diffraction limit, the signal amplitude is much larger than for the pits and lands below the diffraction limit. The nineteen 2 T lands of the InSb disc show a higher reflectivity with regard to the 2 T pits, signal S3, corresponding with the higher reflectivity of the two 19 T lands, and the twenty 2 T pits between the 19 T land and the 20 T pit are clearly resolved.

But the twenty 2 T pits of the AIST disc, signal S4, shows a worse behaviour: The two 19 T lands show also a higher reflectivity, but the twenty 2 T lands of the AgInSbTe disc show a lower reflectivity, in contrast with the twenty 2 T pits of the InSb disc, signal S3. Because of the inverted signal S4 of the 2 T pits, for the AgInSbTe disc only nineteen 2 T pits can be resolved. Therefore, when a random sequence with data is provided, having pits below the diffraction limit and pits above the diffraction limit, the data cannot be decoded correctly for an AgInSbTe disc.

To explain this behaviour, numerical simulations have been made for aperture type super-resolution discs, i.e. AgInSbTe, which yielded the result that the reflectivity increases on pit and decreases on land when the pits and lands are below the diffraction limit, and decreases for pits and increases for lands when they have a size above the diffraction limit. When the pits have a size corresponding with the diffraction limit, there is a competition between the diffractive read out responsible for the detection of the larger pits, and the super-resolution mechanism responsible for the detection of the pits below the diffraction limit, for the material AgInSbTe. With regard to the super-resolution disc comprising an InSb layer, the results are consistent with the diffractive read out of the pits, which provides a increased reflectivity for lands and an decreased reflectivity for pits, independently whether they have a size below or above the diffraction limit. Therefore, the signals of the 2 T pits of the AgInSbTe super-resolution disc are inverted with regard to 20 T pits, as can be seen in FIG. 3.

Figure 4:
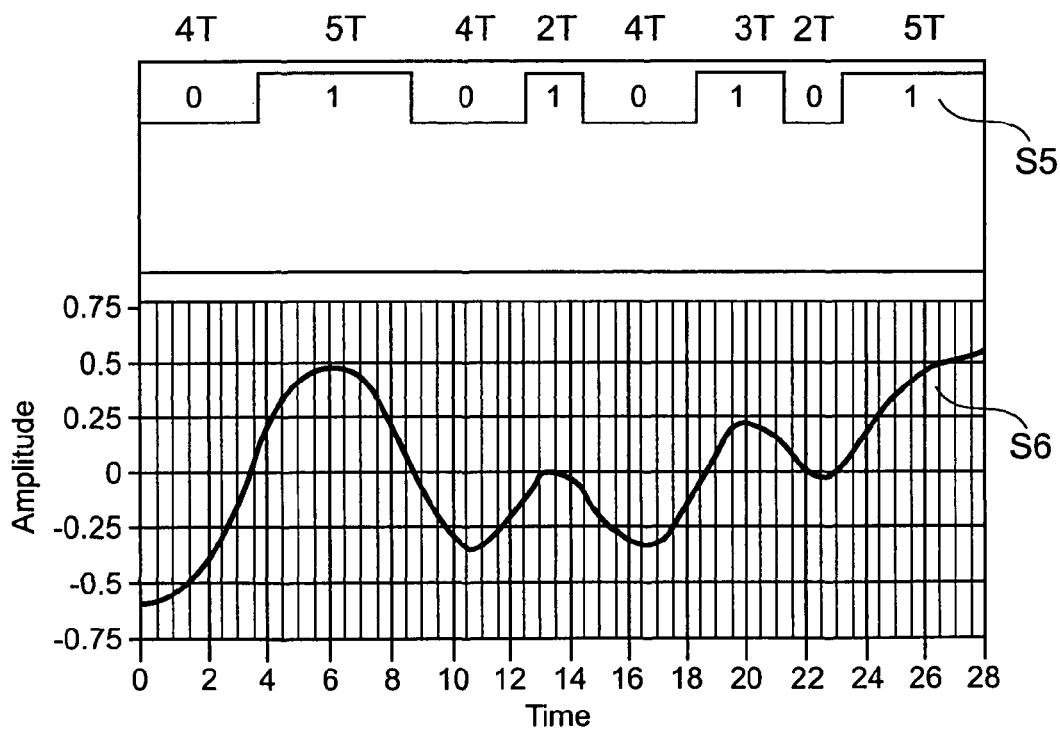

In FIG. 4, a calculated HF signal S6 is shown for a random sequence of pits and lands, graph S5, for a super-resolution disc comprising an InSb mask layer. The pits and lands of the graph S6 have a size from 2 T to 5 T as indicated, lands represented by a logical "1" and pits represented by "0". The simulation result, graph S6, shows clearly a lower reflection for the pits having a size above and below the diffraction limit, and show a higher reflection for lands of all sizes. Therefore, all pits can be clearly resolved and consequently detected by a pickup, when reading the data of the graph S5 arranged on a track of the InSb super-resolution disc.

Figure 5:
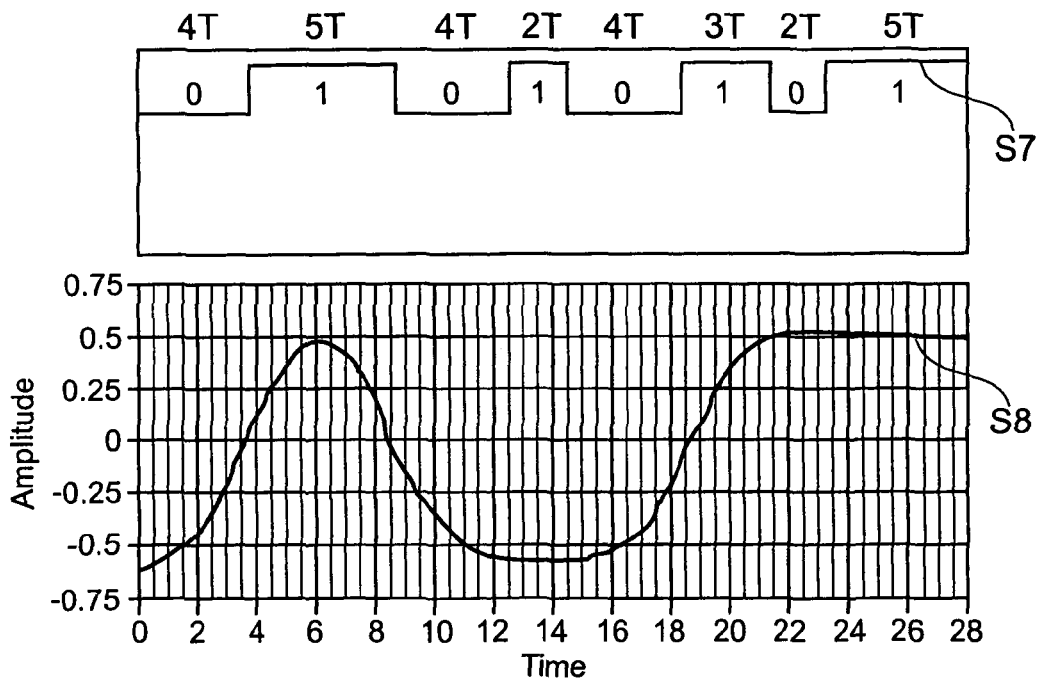

The situation for a super-resolution disc comprising an AgInSbTe mask layer as a super-resolution layer is shown in FIG. 5: The graph S7 corresponds with the same pit and land sequence of graph S5 of FIG. 4 and the signal S8 shows the respective calculated HF signal for the AgInSbTe disc. The 5 T and 3 T lands have a higher amplitude corresponding with a higher reflectivity and the 4 T pits have a lower amplitude corresponding with a lower reflectivity. But the 2 T pit shows a higher reflectivity and the 2 T land shows a lower reflectivity, due to the inversion of the signal for pits and lands having a size below the diffraction limit, as described above, and therefore, they cannot be decoded because their signal is included in the larger pits and lands. The 2 T pits and 2 T lands included in the signal S8 cannot be resolved.

To overcome this problem, a land having a size below the diffraction limit is inverted to a pit and enclosed by auxiliary lands, and a pit having a size below the diffraction limit is inverted to a land and enclosed by auxiliary pits. In the same way, a group of consecutive lands, consecutive pits or consecutive pits and lands having a size below the diffraction limit for all marks of the said group is inverted to a group of pits and/or lands and enclosed by auxiliary pits or lands. By arranging the lands and pits having a size below the diffraction limit on the optical storage medium in an inverted manner with regard to the pits and lands having a size above the diffraction limit, the inversion mechanism as described before for optical storage media comprising a non-linear layer with a phase change material is compensated.

Figure 6:
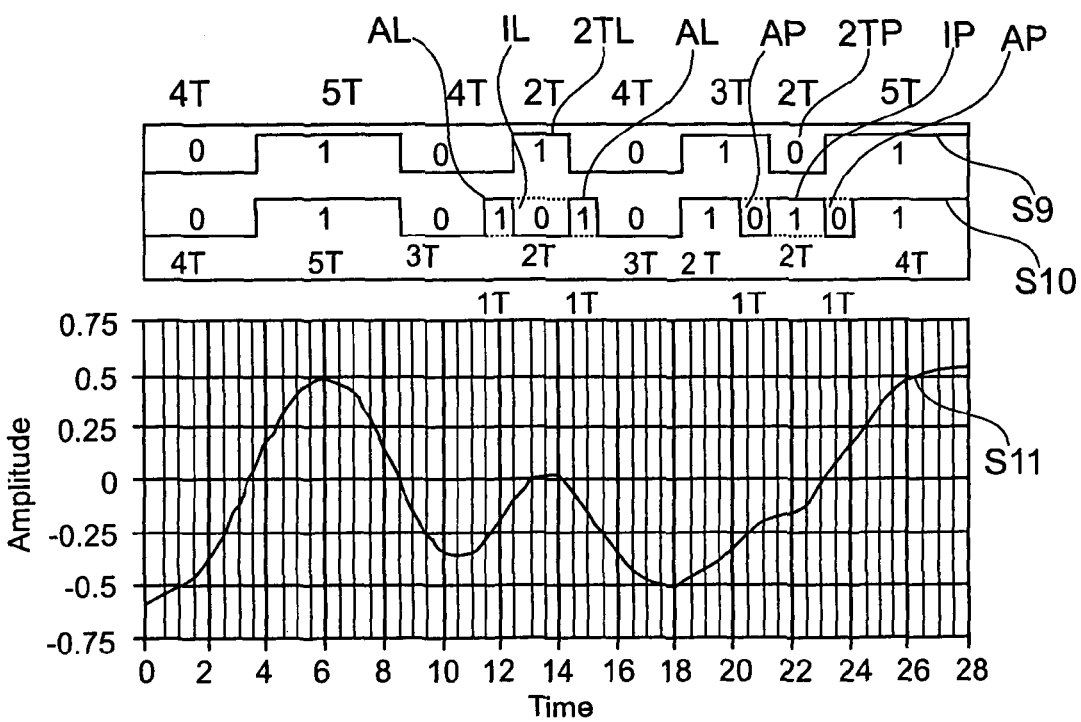

A preferred embodiment comprising inverted pits and lands for providing a correct read-out of a phase change super-resolution optical disk is explained with regard to FIG. 6. A graph S9 shows a sequence of data comprising pits and lands having a size above the diffraction limit and a 2 T pit and a 2 T land having a size below the diffraction limit of a corresponding optical pickup as described with regard to graphs S5 and S7 of FIGS. 4 and 5. The sequence of digital data S9 is encoded into another sequence of digital data S10 in accordance with the invention. The 2 T land 2 TL of graph S9 is inverted into a pit IL, which is separated from the preceding pit by an auxiliary land AL and separated from the subsequent pit by an auxiliary land AL. The preceding and subsequent pits, two 4 T pits, are correspondingly shorter and represented now by two 3 T pits on graph S10. Due to the inverted read-out signal of lands having a size below the diffraction limit, the inverted land IL will produce a reflected signal with a higher amplitude corresponding with the higher amplitudes of the lands having a size above the diffraction limit, and the inverted land IL can be distinguished therefore from the preceding and following 4 T pits, when reading the data of the data sequence of graph S9.

The 2 T pit 2 TP is inverted to a land IP and is separated from the preceding pit by an auxiliary pit AP and separated from the subsequent land by an auxiliary pit AP. The preceding and subsequent pits, 3 T and 5 T pits, are correspondingly shorter by 1 T to obtain the same data density on the optical storage medium. Because of the inversion mechanism of the non-linear layer comprising a phase change material as described above, the inverted 2 T pit IP will be detected as a pit when reading the data signal of graph S9, and therefore, the 2 T pit between the 3 T land and 5 T land can be recognized and correctly decoded. A calculated HF data signal for the data sequence of graph S10 is shown in graph S11, which shows clearly response signals for the inverted land IL and the inverted pit IP.

Alternatively, the 3 T and 5 T lands before and after the inverted pit IP may retain their length, also the 4 T pits preceding and following the inverted land IL, but then the storage capacity of the optical storage medium would be reduced in accordance with the amount of auxiliary pits and lands used on the optical storage medium.

The auxiliary pits AP and auxiliary lands AL have in particular a size being below the diffraction limit of the optical pickup and may be larger or even smaller than a corresponding 1 T land or 1 T pit.

As shown in graph S10, the 3 T land of graph S9 preceding the 2 T pit 2 TP is shortened due to the auxiliary pit AP to a length of 2 T, which falls into the super-resolution regime. Then the 3 T land would not be decoded correctly because all 2 T lands included in the data structure of graph S10 have to be inverted. This situation therefore has to be avoided. This can be done by using an appropriate modulation, which avoids for example 3 T lands following or preceding a 2 T pit, and avoid 3 T pits following or preceding a 2 T land, or by using a modulation algorithm, which does not include any 3 T pits and lands. Another possibility would be to extend the 2 T pits and lands to 3 T pits and lands.

The embodiment as described with regard to FIG. 6 includes 2 T pits and lands having a size below the diffraction limit, and 3 T pits and lands, also larger pits and lands, having a size above the diffraction limit of a corresponding optical pickup. Alternatively, the pits and lands may be designed such, that also 3 T pits and lands have a size below the diffraction limit of the pickup. In this case, the 3 T pits and lands will be inverted also on the storage medium and separated by auxiliary pits respectively lands from a preceding and/or following pit or land having a size above the diffraction limit, in correspondence with the embodiment described with regard to FIG. 6.

A solution to the preceding issue could be found also by adjusting the size of the auxiliary lands or pits such in order to prevent that due to the shortening of smallest diffractive marks and spaces, they fall below the limit of diffraction, keeping it readable with the diffractive read-out. Here a trade-off has to be taken in account, between the minimum applicable length of an auxiliary land or pit and the maximum available length in order to prevent the smallest diffractive mark length to fall below the diffraction limit.

When a pit follows directly a land having both a size below the diffraction limit, or several pits and lands having a size below the diffraction limit follow each other directly, then they are all correspondingly inverted according to the invention, but no auxiliary lands and auxiliary pits are required in between the lands and pits having the size below the diffraction limit. For example, when an inverted 2 T land is followed directly by an inverted 2 T pit, an auxiliary land precedes the pit representing the 2 T land, which is followed by the land representing the 2 T pit. After the land representing the 2 T pit, an auxiliary pit is included, to separate the 2 T land from the subsequent land, when this land has a size being above the diffraction limit. Between the inverted land and the subsequent inverted pit no auxiliary land is included.

The optical storage medium comprising tracks having a data structure as described with regard to FIG. 6 is in particular a read-only optical disk. For the production of an optical disk in accordance with the invention, a corresponding stamper is required, on which the respective data structure is mirrored. Therefore, care has to be taken, that the small auxiliary pits and lands are clearly reproduced on the optical disk by the stamper. The size of the auxiliary pits and lands therefore has to be carefully selected.

Also other embodiments of the invention may be utilized by a person skilled in the art without departing from the spirit and scope of the present invention. The invention resides therefore in the claims herein after appended.

The invention claimed is:

1. Optical storage medium comprising
a substrate layer,
a data layer having a pit/land data structure with data arranged in tracks on the substrate layer, and
a nonlinear layer with a super-resolution structure disposed on the data layer, wherein the data structure comprises pits and lands having a size above a diffraction limit of a pickup for reading of the data and pits and lands having a size below the diffraction limit, wherein
a land having a size below the diffraction limit is inverted to a pit, and a pit having a size below the diffraction limit is inverted to a land, wherein a land being inverted to a pit and a pit being inverted to a land are enclosed by auxiliary lands and/or pits.

2. Optical storage medium according to claim 1, wherein an inverted land is enclosed by auxiliary lands and an inverted pit is enclosed by auxiliary pits.

3. Optical storage medium according to claim 2, wherein a land preceding and a land following an inverted pit are shortened by a length corresponding with the length of an auxiliary land, and a pit preceding and a pit following an inverted land are shortened by a length corresponding with the length of an auxiliary pit.

4. Optical storage medium according to claim 1, wherein the auxiliary lands and pits have a size being below the diffraction limit.

5. Optical storage medium according to claim 4, wherein the auxiliary lands have a size corresponding with a 1 T land and the auxiliary pits have a size corresponding with a 1 T pit.

6. Optical storage medium according to claim 4, wherein the super-resolution structure comprises a phase-change material.

7. Optical storage medium according to claim 6, wherein the phase-change material is a chalcogenide material, for example GeSbTe or AgInSbTe.

8. Optical storage medium according to claim 6, comprising further a cover layer above the nonlinear layer, the storage medium being designed for operation with a laser beam penetrating first the cover layer.

9. Optical storage medium according claim 8, comprising further a first dielectric layer arranged between the nonlinear layer and the data layer and a second dielectric layer arranged between the nonlinear layer and the cover layer.

10. Optical storage medium according to claim 4, wherein the pits and lands of a track having a size below the diffraction limit are 2 T and/or 3 T pits and lands.

11. Optical storage medium according to claim 1, wherein the diffraction limit of the pickup for reading of the data is defined as lambda/4NA, lambda being a laser wavelength and NA a numerical aperture of the pickup.

12. Optical storage medium according to claim 1, wherein between an inverted land and a subsequent inverted pit and between an inverted pit and a subsequent inverted land no auxiliary land or auxiliary pit is included.

13. Optical storage medium according to claim 1, wherein an inverted land is separated from the preceding pit by an auxiliary land and separated from the subsequent pit by an auxiliary land, and wherein an inverted pit is separated from the preceding land by an auxiliary pit and separated from the subsequent land by an auxiliary pit.

14. Optical storage medium according to claim 1, wherein the optical storage medium is a read-only optical disc.

* * * * *